United States Patent Office 3,497,475
Patented Feb. 24, 1970

3,497,475
PROCESS FOR THE PREPARATION OF POLYESTERS OF TEREPHTHALIC ACID AND GLYCOLS
Andre Jan Conix, Antwerp, and Lambert Gaston Jeurissen, Mortsel-Antwerp, Belgium, assignors to Gevaert-Agfa N.V., Mortsel, Belgium, a company of Belgium
No Drawing. Continuation-in-part of application Ser. No. 632,935, Apr. 24, 1967. This application Oct. 20, 1967, Ser. No. 676,744
Claims priority, application Great Britain, Oct. 21, 1966, 22,632/66; Canada, May 16, 1967, 990,642
Int. Cl. C08g 17/015
U.S. Cl. 260—75    10 Claims

ABSTRACT OF THE DISCLOSURE

An improved process for the preparation of polyesters of terephthalic acid and a glycol utilizing germanium dioxide as a catalyst is described. In the improved process the germanium dioxide is dissolved in a glycol under pressure above atmospheric pressure and of from about 1.5 to 15 atmospheres and at an elevated temperature of from about 210 to 300° C. and the solution added to the polycondensation reaction charge of terephthalic acid and glycol in a quantity sufficient to have present in the polycondensation reaction mixture at least 0.005 percent by weight of dissolved germanium dioxide with respect to the weight of glycol terephthalate.

Field of invention and background

The present invention relates to a process for the preparation of polyesters of terephthalic acid and glycols, more particularly ethylene glycol, by polycondensation of a glycol terephthalate in the presence of a germanium compound as catalyst; the application being a continuation-in-part application of United States patent application Ser. No. 632,935, filed Apr. 24, 1967, now abandoned.

It is known from United States Patent No. 2,578,660 to L. A. Auspos and J. B. Dempster, issued Dec. 18, 1951 that germanium dioxide can be used as a catalyst in the polycondensation reaction of a glycol and terephthalic acid. Though high molecular weight compounds can be prepared with germanium dioxide as catalyst, the method described in the aforesaid patent is nevertheless impracticable, due to the very low solubility of germanium dioxide in the reaction mixture, which results in undissolved catalyst remaining in the polymer. The remaining undissolved catalyst will, during working up of the polymer, obviously entail difficulties such as clogging of the filtering apparatus on melting for extrusion purposes. Moreover, filtering off the very fine undissolved catalyst particles is difficult. If the polymer is used for the fabrication of film, the film will contain inclusions in the form of irregularly distributed specks or be hazy. This is unsatisfactory if the film is to be used as a film base for photographic purposes. Furthermore, the low effective catalyst concentration causes long reaction times.

General description of the invention

Accordingly, it is a primary object of this invention to provide an improved process for the preparation of polyesters of terephthalic acid and glycols utilizing germanium dioxide as a catalyst.

It is another object of this invention to provide improved polyesters of terephthalic acid and a glycol, said polyesters being light in color.

It is still another object of this invention to provide an improved process for the preparation of a catalytic solution of germanium dioxide and a glycol.

These and other objects of the invention will become more readily apparent from the following detailed description with particular emphasis being placed upon the examples.

According to the present invention, polyesters of terephthalic acid and a glycol are prepared utilizing a catalytic solution of a glycol and germanium dioxide in the polycondensation reaction. The catalytic solution is made up by dissolving germanium dioxide in a glycol by heating germanium dioxide and the glycol under a pressure of from about 1.5 to 15 atmospheres at a temperature of from about 210 and 300° C. It is noted that when employing pressures below about 1.5 atmospheres and temperatures below about 210° C., little or no solubilization of the germanium dioxide in the glycol is realized in a reasonable time. The germanium dioxide in the glycol solution should have a concentration of at least about 0.02 percent by weight with respect to the glycol to assure at least 0.005 percent by weight of dissolved germanium dioxide with respect to the weight of glycol terephthalate when added to the polycondensation reaction charge. However, utilizing the aforesaid procedures, it is possible to obtain catalytic solutions containing at least as much as about 2.5 percent of germanium dioxide in the glycol. Preferably, the catalytic solutions are made up in a concentration of from about 0.15 and 2.5 percent by weight of the glycol. The preparation of solutions having the higher concentrations has the advantage that the size of the pressure vessel which is needed for preparing the catalytic solution for one batch of polycondensate can be kept relatively small since the higher the concentration of germanium dioxide in the catalytic solution, the smaller the volume of catalytic solution which is needed in the polycondensation vessel. Alternatively, the catalytic solution can be made up in a larger vessel and the solution employed as a stock solution. The stock solution can be used in preparing several batches of the polyester eliminating the need for making a catalytic solution for each batch of polyester. Furthermore, the germanium dioxide-glycol solution, as will be more fully apparent hereinafter, can be added at various times in the preparation of the polyester.

The preparation of polyesters of terephthalic acid and a glycol comprises two separate reaction phases although the reactions may be carried out continuously. The first reaction phase results in the formation of a glycol terephthalate. The second reaction phase or second step of the continuous reaction is the polycondensation reaction resulting in the formation of high polymers. The catalytic solution of germanium dioxide and glycol is only essential in the polycondensation reaction. However, it is possible to have the catalytic solution, as will be more apparent hereinafter, present during the initiation reaction phase resulting in the glycol terephthalate. Accordingly, the glycol terephthalates can be prepared utilizing various prior art procedures. The procedure most commonly employed comprises the transesterification reaction between the glycol and a lower alkyl ester of terephthalic acid, e.g., dimethyl terephthalate. Other methods which may be employed include direct esterification of terephthalic acid and a glycol or conversion of terephthalic acid and ethylene oxide. When utilizing the transesterification method of obtaining the glycol terephthalate, it is preferred that a transesterification catalyst be employed which does not color the polyester which is being formed. Suitable catalysts are compounds of alkali metals and alkaline earth metals; compounds of praseodymium, cerium, and lanthanum; and certain salts of zinc, cadmium, or manganese such as described in British Patent No. 816,215 filed June 24, 1955 by Gevaert Photo-Producten, N.V.

The second reaction or second phase of the continuous reaction to provide polyesters having high molecular weights must be carried out in the presence of a catalyst. According to the present invention, sufficient catalyst solution or germanium dioxide and glycol to have a concentration of at least 0.005 percent by weight of dissolved germanium dioxide, and normally not more than about 0.02 percent by weight, based on the glycol terephthalate present, is utilized. Although higher concentrations of the catalytic solution can be employed without detriment, it is normally not desirable in that the polycondensation rates are not increased, or at least not increased substantially, when greater amounts of catalysts are employed. In the polycondensation reaction, during the initial phase glycol is distilled off while stirring at atmospheric pressure. The second phase of the reaction is carried out under vacuum while distilling glycol. The polycondensation reaction can be carried out either in a continuous process or in a bath process.

As noted hereinbefore, catalytic solutions prepared according to the present invention can be added to the reaction mixture at any of the various steps in the polyester manufacture with it only being essential that the catalytic solution be present during the polycondensation phase of the preparation. However, it is preferred that the catalytic solution be added after the formation of the glycol terephthalate and before the first phase of the polycondensation step. This is the case in that to obtain polyesters having the most favorable properties such as a high melting point, it is advantageous that the germanium dioxide be present in the reaction medium at high temperatures for as short a time as possible. However, where it is essential that the catalyst be present before the preparation of the glycol terephthalate because of equipment limitations or the like, it is possible to add the catalytic solution prior to the preparation of the glycol terephthalate.

The following examples are cited to illustrate the invention. They are not intended to limit it in any way. In these examples the inherent viscosity $\eta_{inh}$, which is a measure of the degree of polycondensation, is calculated from the equation:

$$\eta_{inh} = \frac{\ln \eta_{rel}}{c}$$

wherein $\eta_{rel}$ (the relative viscosity) is found from $$\eta_{rel} = \frac{\text{flow time of the solution}}{\text{flow time of the solvent}}$$

and wherein $c$ is the concentration. $\eta_{rel}$ is determined at 25° C. for a solution having a concentration $c$ of 0.5 g. of polyester per 100 ccs. of a 60:40 mixture of phenol and symmetrical tetrachloroethane.

The crystalline melting point of the polymer is determined by heating a crystallized sample of polyester on the heating stage of a polarizing microscope. The temperature of the hot stage is raised at a rate of 0.8° C./min. The crystalline melting point is the temperature at which between crossed nicols the last trace of birefringence disappears.

At the end of the polycondensation period the color of the molten polyester is measured in a Lovibond Tintometer and recorded in terms of the Lovibond scale. This scale consists of permanent glass filters graduated in a strictly linear scale, from the palest perceptible color to a fully saturated one, in the three substractive primary colors red, yellow, and blue. By selecting suitable combinations from these scales, any color, as well as grey to black, can be matched. This method has been described in "Colorimetric Chemical Analytical Methods," 2 volumes of a loose-leaf text book published by the Tintometer Ltd., Salisbury, England.

Example 1

A catalyst solution is made by heating in an autoclave fitted with a stirrer 1 g. of germanium dioxide and 100 ccs. of ethylene glycol for two hours at 250° C. under a pressure of 5 atm. A clear 1 percent solution is obtained.

A similar preparation was carried out with the only difference being that the temperature was 197° C., the boiling point of ethylene glycol, and the pressure was 1 atm. Under the aforesaid conditions, the germanium dioxide remained undissolved.

An amount of 0.42 cc. of the solution prepared under pressure, containing 4.2 mg. of germanium dioxide ($2 \times 10^{-4}$ mole/mole of dimethyl terephthalate) is placed in a 25 mm. (internal diameter) glass polymerization tube, together with 38.8 g. of dimethyl terephthalate, 27 g. of ethylene glycol and 9.8 mg. of manganese acetate tetrahydrate ($2 \times 10^{-4}$ mole/mole of dimethyl terephthalate). The reactants are heated for one hour at 197° C. under atmospheric pressure. A continuous stream of dry nitrogen is introduced through a capillary tube reaching to the bottom of the reaction tube. The transesterification being finished, the temperature is gradually raised over 30 minutes to 282° C. and the unreacted ethylene glycol distilled off. The pressure is reduced to 0.1 to 0.3 millimeter of mercury pressure, while the melt is stirred under dry nitrogen. After two hours at 282° C., vacuum is released and polyethylene terephthalate polyester is obtained having an inherent viscosity of 0.78. The polyester is clear and has a Lovibond color combination of 0.2 red and 1.8 yellow. It melts at 266° C., which indicates a low diethylene glycol content.

Example 2

38.8 g. of dimethyl terephthalate and 22.6 g. of ethylene glycol are placed in a 25 millimeter (inside diameter) glass polymerization tube, and 9.8 mg. of manganese acetate tetrahydrate ($2.10^{-4}$ mole/mole of dimethyl terephthalate), together with 4.2 ccs. of a 0.1 percent solution of germanium dioxide in mole/mole of dimethyl terephthalate) are added. The 0.1 percent solution of germanium dioxide in ethylene glycol was prepared as described in the first paragraph of Example 1, with the exception that only 100 mg. of germanium dioxide was used.

The reactants are heated for one hour at 197° C. under atmospheric pressure. A continuous stream of dry nitrogen is introduced through a capillary tube reaching to the bottom of the reaction tube. The transesterification being finished, the temperature is gradually raised over 30 minutes to 282° C. and the unreacted ethylene glycol distilled off. Subsequently, 26 mg. of triphenyl phosphate ($4.10^{-4}$ mole/mole of dimethyl terephthalate) is added as stabilizer. The pressure is reduced to 0.1 to 0.3 millimeter of mercury pressure, while the melt is stirred under dry nitrogen. After two hours at 282° C., vacuum is released and polyethylene terephthalate polyester is obtained having an inherent viscosity of 0.62. The polyester is clear and has a Lovibond color combination of 0.5 yellow.

Example 3

A catalyst solution is made by heating 1 g. of germanium dioxide and 100 ccs. of ethylene glycol for two hours at 225° C. under a pressure of 3 atm. A clear 1 percent solution is obtained.

An amount of 0.42 cc. of the aforesaid solution, containing 4.2 mg. of germanium dioxide ($2.10^{-4}$ mole/mole of dimethyl terephthalate) is placed in a 25 mm. (internal diameter) glass polymerization tube, together with 38.8 g. of dimethyl terephthalate, 27 g. of ethylene glycol and 8.8 mg. of zinc acetate dihydrate ($2.10^{-4}$ mole/mole of dimethyl terephthalate). The reactants are heated for one hour at 197° C. under atmospheric pressure. A continuous stream of dry nitrogen is introduced through a capillary tube reaching to the bottom of the reaction tube. The transesterification being finished, the temperature is gradually raised over 30 minutes to 282° C. and the unreacted ethylene glycol distilled off. The pressure is reduced to 0.1 to 0.3 millimeter of mercury pressure, while the melt is stirred under dry nitrogen. After two hours at 282° C., vacuum is released and polyethylene terephthalate polyester is obtained having an inherent viscosity of 0.68. The polyester is clear and has a Lovibond color combination of 0.5 red and 2.0 yellow. It melts at 265° C., thus indicating a low diethylene glycol content.

Example 4

A catalyst solution is made by heating 500 mg. of germanium dioxide and 100 ccs. of ethylene glycol for two hours at 210° C. under a pressure of 1.5 atmospheres. A clear 0.5 percent solution is obtained.

An amount of 0.84 cc. of this solution, containing 4.2 mg. of germanium dioxide ($2.10^{-4}$ mole/mole of dimethyl terephthalate), 38.8 g. of dimethyl terephthalate, and 27.3 g. of ethylene glycol are placed in a 25 millimeter inside diameter glass polymerization tube, and 16.5 mg. of manganese monomethyl terephthalate ($2.10^{-4}$ mole/mole of dimethyl terephthalate) is added. The reactants are heated for 1¼ hours at 197° C. at atmospheric pressure. A continuous stream of dry nitrogen is introduced through a capillary tube reaching to the bottom of the reaction tube. The transesterification being finished, the temperature is gradually raised over 30 minutes to 282° C. and the unreacted ethylene glycol distilled off. The pressure is reduced to 0.1 to 0.3 millimeter of mercury pressure, while the melt is stirred under dry nitrogen. After three hours at 282° C., vacuum is released and a polyethylene terephthalate polyester is obtained having an inherent viscosity of 0.69. The polyester is clear, and has a Lovibond color combination of 0.3 red and 1.2 yellow. It melts at 266.5° C. indicating a low diethylene glycol content.

Example 5

38.8 g. of dimethyl terephthalate (0.2 mole) and 27.3 g. of ethylene glycol (0.44 mole) are placed in a 25 millimeter inside diameter glass polymerization tube, and 16.5 mg. of manganese monomethyl terephthalate ($2.10^{-4}$ mole/mole of dimethyl terephthalate) is added. The reactants are heated for 1¼ hours at 197° C. at atmospheric pressure. A continuous stream of dry nitrogen is introduced through a capillary tube reaching to the bottom of the reaction tube. The transesterification being finished, 0.84 cc. of a 0.5 percent solution of germanium dioxide in ethylene glycol, containing 4.2 mg. of germanium dioxide ($2.10^{-4}$ mole/mole of dimethyl terephthalate) and prepared as described in the first paragraph of Example 4, is added. Then, the temperature is gradually raised over 30 minutes to 282° C. and the unreacted ethylene glycol distilled off. The pressure is reduced to 0.1 to 0.3 millimeter of mercury pressure, while the melt is stirred under dry nitrogen. After three hours at 282° C., vacuum is released and polyethylene terephthalate polyester is obtained having an inherent viscosity of 0.69. The polyester is clear, has a Lovibond color combination of 0.2 red and 1.3 yellow, and melts at 266° C., indicating a low diethylene glycol content.

Example 6

38.8 g. of dimethyl terephthalate (0.2 mole) and 27.3 g. of ethylene glycol (0.44 mole) are placed in a 25 millimeter inside diameter glass polymerization tube, and 16.5 mg. of manganese monomethyl terephthalate ($2.10^{-4}$ mole/mole of dimethyl terephthalate) is added. The reactants are heated for two hours at 197° C. at atmospheric pressure. A continuous stream of dry nitrogen is introduced through a capillary tube reaching to the bottom of the reaction tube. The transesterification being finished, 0.42 cc. of a 1 percent solution of germanium dioxide in ethylene glycol, containing 4.2 mg. of germanium dioxide ($2.10^{-4}$ mole/mole of dimethyl terephthalate) and prepared as described in the first paragraph of Example 1, is added, together with 12 mg. of triphenyl phosphite ($2.10^{-4}$ mole/mole of dimethyl terephthalate) as stabilizer. Then, the temperature is gradually raised over 30 minutes to 282° C. and the unreacted ethylene glycol distilled off. The pressure is reduced to 0.1 to 0.3 millimeter of mercury pressure, while the melt is stirred under dry nitrogen. After 3½ hours at 282° C., vacuum is released and a polyethylene terephthalate polyester is obtained having a viscosity of 0.75. The polyester is clear, and has a Lovibond color combination of 0.2 red and 1.0 yellow. It melts at 267.5° C. indicating a very low diethylene glycol content.

In the above examples, the ethylene glycol, both in the preparation of the catalytic solutions and in the polyester formation, can be replaced with other glycols to provide polyesters having modified properties. Such glycols include 1,4-di(hydroxymethyl)-cyclohexane, propylene glycol, neopentyl glycol, butylene glycol, and the like. The germanium dioxide employed in the aforesaid examples can be used in the various forms commercially available, including calcinated, containing only about 0.3 percent water, or non-calcinated containing up to about 15 percent water. The non-calcinated material is preferred.

In working with the germanium dioxide glycol solutions, it has been noted that at concentrations of from about 0.6 to 2.5 percent germanium dioxide, at room temperatures there is a tendency for the solution to become cloudy which finally results in the precipitation of part of the germanium dioxide. This can be avoided by keeping the stock solution at a temperature above about 50° C.

When compared with other known polycondensation catalysts such as antimony compounds, titanium compounds, and tin compounds, the germanium-glycol catalytic solution of the present invention have distinct advantages in that the polyesters obtained are of high molecular weight, very clear, and nearly colorless polymers. If the polyester is to be used for the preparation of films as photographic supports, clearness and absence of color is of the utmost importance. Another advantage of the use of germanium dioxide-glycol solutions as polycondensation catalysts is that films prepared from the polyesters have very good stretching properties. When germanium dioxide in solid form is added to the reactants of the transesterification reaction and this reaction is carried out under super-atmospheric pressure and high temperature, products having unsatisfactory properties from the standpoint of coloring and high di-ethylene glycol content are obtained.

The polyesters made in accordance with the present invention have excellent utility as films in photographic supports.

As will be apparent to one skilled in the art, numerous modifications can be made in the aforesaid process for preparing improved terephthalic acid glycol polyesters without departing from the inventive concept herein disclosed. Such modifications being within the ability of one skilled in the art are intended to be covered herein with the invention only being limited by the appended claims.

What we claim is:

1. In a process for the preparation of film-forming polyesters of terephthalic acid and glycols by the polycondensation of a glycol terephthalate in the persence of a solution of germanium dioxide in glycol as catalyst for said polycondensation reaction, the improvement comprising dissolving germanium dioxide in the glycol by separately heating germanium dioxide in glycol under a pressure above atmospheric pressure and of from about 1.5 to 15 atmospheres and at a temperature of from about 210 to 300° C., said glycol being the same as that used in the preparation of the glycol terephthalate, adding the resultant catalyst solution wherein the germanium dioxide is dissolved in said glycol at a concentration of at least about 0.02 percent by weight, based on the weight of said glycol to the polycondensation reaction mixture at the latest during the polycondensation of the glycol terephthalate and in a quantity sufficient to have present in said polycondensation reaction mixture at least 0.005 percent by weight of dissolved germanium dioxide with respect to the weight of glycol terephthalate, and polycondensing said glycol terephthalate.

2. The process of claim 1 wherein the catalyst solution is added to the polycondensation reaction mixture after a glycol-terephthalate is formed.

3. The process of claim 1 wherein the catalytic solution is added to the polycondensation reaction mixture prior to the formation of a glycol-terephthalate.

4. The process of claim 1 wherein the said catalyst solution is obtained by heating germanium dioxide and the glycol under a pressure of from about 2 to 15 atmospheres at a temperature of from about 225 to 300° C.

5. The process of claim 1 wherein the germanium dioxide is dissolved in the glycol at a concentration of from about 0.15 to 2.5 percent by weight, based on the weight of the glycol.

6. The process of claim 1 wherein the glycol is ethylene glycol.

7. A process for the preparation of a catalytic solution of germanium dioxide and glycol, said solution having up to about 2.5 percent germanium dioxide on a weight basis, comprising the steps of heating the germanium dioxide and glycol at a pressure above atmospheric pressure and of from about 1.5 to 15 atmospheres and at a temperature of from about 210 to 300° C.

8. The process of claim 7 wherein the glycol is ethylene glycol.

9. The process of claim 8 wherein the germanium dioxide is present at from about 0.15 to 2.5 percent on a weight basis.

10. A catalytic solution of germanium dioxide and a glycol, said solution comprising 0.15 to 2.5 percent germanium dioxide on a weight basis.

References Cited
UNITED STATES PATENTS

| | | | |
|---|---|---|---|
| 2,465,319 | 3/1949 | Whinfield | 260—75 |
| 2,951,060 | 8/1960 | Billica | 260—75 |
| 3,346,541 | 10/1967 | Davies | 260—75 |

WILLIAM H. SHORT, Primary Examiner

LOUISE P. QUAST, Assistant Examiner

U.S. Cl. X.R.

252—430; 260—475

UNITED STATES PATENT OFFICE
CERTIFICATE OF CORRECTION

Patent No. 3,497,475                                         February 24, 1970

Andre Jan Conix et al.

It is certified that error appears in the above identified patent and that said Letters Patent are hereby corrected as shown below:

In the heading to the printed specification, line 12, after "Great Britain," insert -- May 20, 1966 and --.

Signed and sealed this 22nd day of December 1970.

(SEAL)
Attest:

Edward M. Fletcher, Jr.                         WILLIAM E. SCHUYLER, JR.
Attesting Officer                                     Commissioner of Patents